Patented May 25, 1954

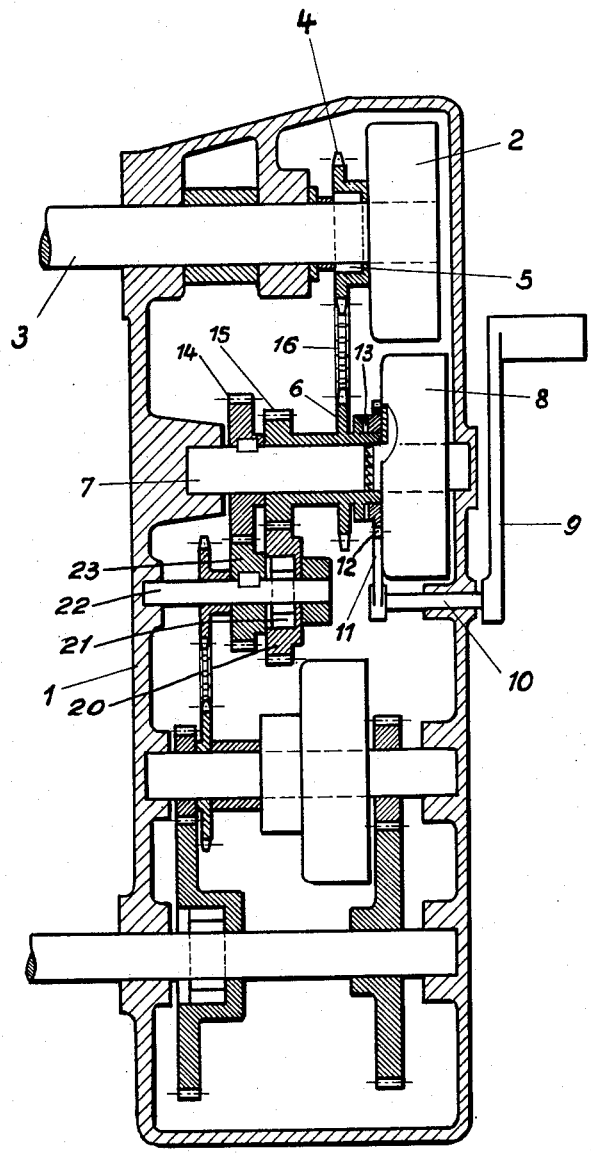

2,679,166

UNITED STATES PATENT OFFICE 2,679,166

AUTOMATICALLY OPERATING CHANGE SPEED GEAR, PARTICULARLY FOR MOTORCYCLES

Fritz Kreis, Wurzburg, Germany

Application June 2, 1951, Serial No. 229,558

6 Claims. (Cl. 74—336)

This invention relates to an automatically operating change speed gear, particularly intended for motorcycles.

In the known automatically operating change speed gears for motorcycles, in which the automatic shifting of the speed stages is effected by means of centrifugal clutches arranged alongside each other on a gear shaft, the motor is usually started by means of a kickstarter which drives the motor shaft directly. Likewise, where for constructive necessity the centrifugal clutches are arranged one behind the other on a plurality of shafts, the motor can only be started when the kickstarter acts directly on the motorshaft, so that disengagement of the clutches as is necessary when the motorcycle is at a standstill is possible without hindering the movement of the kickstarter.

In practice, a direct coupling between the kickstarter and the motorshaft is in most cases not a practical possibility since high transmission ratios would be necessary which would be difficult to locate within the gearbox and would undesirably increase the cost of manufacture of the gear. Further, in many cases the kickstarter cannot be arranged on the motorshaft since its location and operation in that position would be difficult.

It is advantageous to make use of the already existing gear transmission for the operation of the kickstarter and to insert the latter behind the clutch of the second, or if required behind the third speed stage. Thus, one or two clutches will be arranged between the motorshaft and the kickstarter. As a consequence, however, the driving connection would be interrupted when the motor is at a standstill, as well as at low revolution speeds of the clutches. The starting of the motor by means of the kickstarter, with such an arrangement, is therefore not possible, so that these desirable advantages cannot be achieved.

The object of the invention is to eliminate this interruption of the drive connection, so that with the above clutch arrangement, when the motor is at a standstill, a power connection is provided from the kickstarter to the motor, while with the motor running, the power can be transmitted through the starting clutch to the gear.

This is achieved, according to the invention, by arranging that in the hub of each pinion of each centrifugal clutch between the motor and kickstarter, an overtaking clutch is inserted.

In one embodiment of the invention, which is particularly advantageous, this overtaking clutch takes the form of a freewheel mechanism.

The object of the invention is shown by way of example in the annexed drawing.

A box 1 contains a speed change gear in which the centrifugal clutches are arranged one behind the other, that is to say each clutch is arranged on a separate shaft. The starting clutch 2, which is also the clutch for the first speed stage, is supported on the end of the motorshaft 3, which also carries a pinion 4. This pinion is firmly connected to one half of the clutch 2, both the pinion and the connected half of the clutch 2 being loose on the shaft 3. The hub of the pinion 4 contains an overtaking clutch in the form of a freewheel mechanism 5. The pinion 4 is connected by a chain 16 to a chain wheel 6 supported loosely on the gearshaft 7. For the second speed stage a centrifugal clutch 8 is provided and is also supported on gearshaft 7.

The kickstarter 9 with its shaft 10 is supported in the box 1 and is formed with a toothed sector 11 which meshes with a gear wheel 12 which is supported for axial movement on the hub of the chain wheel 6 which is connected to gear 15. Members 6 and 15 are freely rotatable on shaft 7. The gear wheel 12 is in known manner firmly connected to one half of the pawl coupling 13, while the other half of this coupling is fixed to chain wheel 6.

When operating the kickstarter 9, the movement is transmitted to the motorshaft 3, and hence to the motor, through gear wheel 12, pawl coupling 13, chain wheel 6, chain 16, pinion 4 and free wheel mechanism 5. The drive connection which was interrupted by centrifugal clutch 2, restored by means of freewheel mechanism 5 and the motor can be started.

Once the motor has been started, the drive will be transmitted in inverse direction through clutch 2 which is now rotated after having reached its operative speed, and power is now transmitted to the pinion 4 from the centrifugal clutch half connected therewith. From pinion 4, the power transmission passes through chain 16, chain wheel 6 to gears 14 and 15 which transmit further to the remaining part of the gear and to the driven shaft.

The chain wheel 6 is non-rotatably connected with the gear 15 which is freely rotatable on the driven shaft 7. Gear 15 meshes with a gear 20 which is attached by an overrunning clutch 21 to the auxiliary shaft 22. The overrunning clutch 21 is not an object of the present invention, and a key may be substituted for the overrunning clutch 21. On the auxiliary shaft 22 is keyed another gear 23 which meshes with the gear 14. Gear 14 is keyed to the driven shaft 7. When the chain wheel 6 is driven from the shaft 3 through the chain wheel 4, which is the case when the centrifugal clutch 2 is engaged, shaft 7 is driven through the gears 15, 20, 23 and 14.

What I claim is:

1. In a variable speed change gear, in combination, a drive shaft; centrifugal clutch means mounted on said drive shaft and including a freely rotatable member, and means connecting at a predetermined speed said freely rotatable member with said shaft for common rotation; a driven shaft; transmission means connecting said drive shaft with said driven shaft and including a first member loosely mounted on said drive shaft and fixedly connected to said freely rotatable member, and a second member loosely mounted on said driven shaft; a rotatable element loosely mounted on said driven shaft; movable operating means connected to said rotatable element for rotating the same and adapted to be actuated by an operator; coupling means between said second member and said rotatable element; and overrunning clutch means connecting said first member with said drive shaft for rotation when said first member is rotated relatively thereto by said operating means through said rotatable element, said coupling means, and said second member.

2. In a variable speed change gear, in combination, a drive shaft; centrifugal clutch means mounted on said drive shaft and including a freely rotatable member, and means connecting at a predetermined speed said freely rotatable member with said shaft for common rotation; a driven shaft; transmission means connecting said drive shaft with said driven shaft and including a first chain wheel loosely mounted on said drive shaft and fixedly connected to said freely rotatable member, a chain, and a second chain wheel loosely mounted on said driven shaft; a rotatable element loosely mounted on said driven shaft; movable operating means connected to said rotatable element for rotating the same and adapted to be actuated by an operator; coupling means between said second chain wheel and said rotatable element; and overrunning clutch means connecting said first chain wheel with said drive shaft for rotation when said first chain wheel is rotated relatively thereto by said operating means through said rotatable element, said coupling means, and said second chain wheel.

3. In a variable speed change gear, in combination, a drive shaft; centrifugal clutch means mounted on said drive shaft and including a freely rotatable member, and means connecting at a predetermined speed said freely rotatable member with said shaft for common rotation; a driven shaft; transmission means connecting said drive shaft with said driven shaft and including a first chain wheel loosely mounted on said drive shaft and fixedly connected to said freely rotatable member, a chain, and a second chain wheel loosely mounted on said driven shaft; a gear loosely mounted on said driven shaft; movable operating means including a toothed sector meshing with said gear for rotating the same and adapted to be actuated by an operator; coupling means between said second chain wheel and said gear; and overrunning clutch means connecting said first chain wheel with said drive shaft for rotation when said first chain wheel is rotated relatively thereto by said operating means through said gear, said coupling means, and said second chain wheel.

4. In a variable speed change gear, in combination, a drive shaft; centrifugal clutch means mounted on said drive shaft and including a freely rotatable member, and means connecting at a predetermined speed said freely rotatable member with said shaft for common rotation; a driven shaft; transmission means connecting said drive shaft with said driven shaft and including a first member loosely mounted on said drive shaft and fixedly connected to said freely rotatable member, and a second member loosely mounted on said driven shaft; a rotatable element loosely mounted on said driven shaft; movable operating means connected to said rotatable element for rotating the same and adapted to be actuated by an operator; coupling means between said second member and said rotatable element; and freewheel means connecting said first member with said drive shaft for rotation when said first member is rotated relatively thereto by said operating means through said rotatable element, said coupling means, and said second member.

5. In a variable speed change gear, in combination, a drive shaft; centrifugal clutch means mounted on said drive shaft and including a freely rotatable member, and means connecting at a predetermined speed said freely rotatable member with said shaft for common rotation; a driven shaft; transmission means connecting said drive shaft with said driven shaft and including a first chain wheel loosely mounted on said drive shaft and fixedly connected to said freely rotatable member, a chain, and a second chain wheel loosely mounted on said driven shaft; a gear loosely mounted on said driven shaft; movable operating means including a toothed sector meshing with said gear for rotating the same and adapted to be actuated by an operator; coupling means between said second chain wheel and said gear; and freewheel means connecting said first chain wheel with said drive shaft for rotation when said first chain wheel is rotated relatively thereto by said operating means through said gear, said coupling means, and said second chain wheel.

6. In a variable speed change gear, in combination, a casing; a drive shaft mounted in said casing; centrifugal clutch means mounted on said drive shaft and including a freely rotatable member, and means connecting at a predetermined speed said freely rotatable member with said shaft for common rotation; a rotatable member with said shaft for common rotation; a driven shaft mounted in said casing; transmission means connecting said drive shaft with said driven shaft and including a first chain wheel loosely mounted on said drive shaft and fixedly connected to said freely rotatable member, a chain, and a second chain wheel loosely mounted on said driven shaft; a gear loosely mounted on said driven shaft; movable operating means including a toothed sector meshing with said gear for rotating the same and a foot engaging member turnably mounted on said casing and adapted to be actuated by an operator; coupling means between said second chain wheel and said gear; and overrunning clutch means connecting said chain wheel with said drive shaft for rotation when said first chain wheel is rotated relatively thereto by said operating means through said gear, said coupling means, and said second chain wheel.

References Cited in the file of this patent
UNITED STATES PATENTS

| Number | Name | Date |
| --- | --- | --- |
| 1,125,130 | Lake et al. | Jan. 19, 1915 |
| 1,125,842 | Gustafson | Jan. 19, 1915 |
| 2,024,109 | Nardone | Dec. 10, 1935 |
| 2,230,293 | Harris | Feb. 4, 1941 |